United States Patent [19]
Tozaki et al.

[11] Patent Number: 6,085,267
[45] Date of Patent: Jul. 4, 2000

[54] METHOD OF AND APPARATUS FOR RECORDING INFORMATION ON RECORD MEDIUM, AND APPARATUS FOR REPRODUCING THE SAME

[75] Inventors: Akihiro Tozaki, Tsurugashima; Hiroshi Nakamura, Tokorozawa, both of Japan

[73] Assignee: Pioneer Electronic Corporation, Tokyo, Japan

[21] Appl. No.: 09/244,778

[22] Filed: Feb. 5, 1999

Related U.S. Application Data

[63] Continuation of application No. 08/675,016, Jul. 3, 1996, Pat. No. 5,892,983.

[30] Foreign Application Priority Data

Jul. 6, 1995 [JP] Japan ................................. 7-170913

[51] Int. Cl.[7] .................................................. G06F 13/00
[52] U.S. Cl. ........................................................... 710/68
[58] Field of Search ............................... 710/68; 395/523, 395/115

[56] References Cited

U.S. PATENT DOCUMENTS

| | | |
|---|---|---|
| 5,396,595 | 3/1995 | Standley . |
| 5,627,995 | 5/1997 | Miller et al. . |
| 5,630,092 | 5/1997 | Carreiro et al. . |
| 5,644,791 | 7/1997 | Brady et al. . |
| 5,652,917 | 7/1997 | Maupin et al. . |
| 5,655,138 | 8/1997 | Kikinis . |
| 5,805,826 | 9/1998 | Kim et al. . |
| 5,892,983 | 4/1999 | Tozaki et al. ............................. 710/68 |

FOREIGN PATENT DOCUMENTS

| | | |
|---|---|---|
| 0424903 A2 | 5/1991 | European Pat. Off. . |
| 0606868 A2 | 7/1994 | European Pat. Off. . |
| 0618695 A2 | 10/1994 | European Pat. Off. . |
| 0634867 A2 | 1/1995 | European Pat. Off. . |
| 0644692 A2 | 3/1995 | European Pat. Off. . |
| 0675493 A2 | 10/1995 | European Pat. Off. . |
| WO 9407332 | 3/1994 | WIPO . |

OTHER PUBLICATIONS

European Search Report for Application No. EP 96304936, Sep. 17, 1998.

Primary Examiner—Glenn A. Auve
Attorney, Agent, or Firm—Morgan, Lewis & Bockius LLP

[57] ABSTRACT

A recording apparatus for recording information on a record medium is provided with: a controller for generating a start address of each time-unit piece of main information divided by a predetermined time-unit based on time information corresponding to the main information; a processsing device for coding and compressing the main information by every predetermined compression unit to generate a plurality of compression-unit pieces of compressed data; and a recording device for recording the plurality of compression-unit pieces of compressed data and the generated start address as at least a portion of access information for the main information onto the record medium.

8 Claims, 11 Drawing Sheets

FIG. 3

ACCESS INFORMATION

| GOP1 START ADDRESS | GOP2 START ADDRESS | ------ | GOPm START ADDRESS | TIME UNIT 1 START ADDRESS | TIME UNIT 2 START ADDRESS | ------ | TIME UNIT n START ADDRESS |
|---|---|---|---|---|---|---|---|

ACCESS INFORMATION

302

| GOP1 START ADDRESS | GOP2 START ADDRESS | ------ | GOPm START ADDRESS | GOP1 NUMBER OF FRAMES | GOP2 NUMBER OF FRAMES | ------ | GOPn NUMBER OF FRAMES |

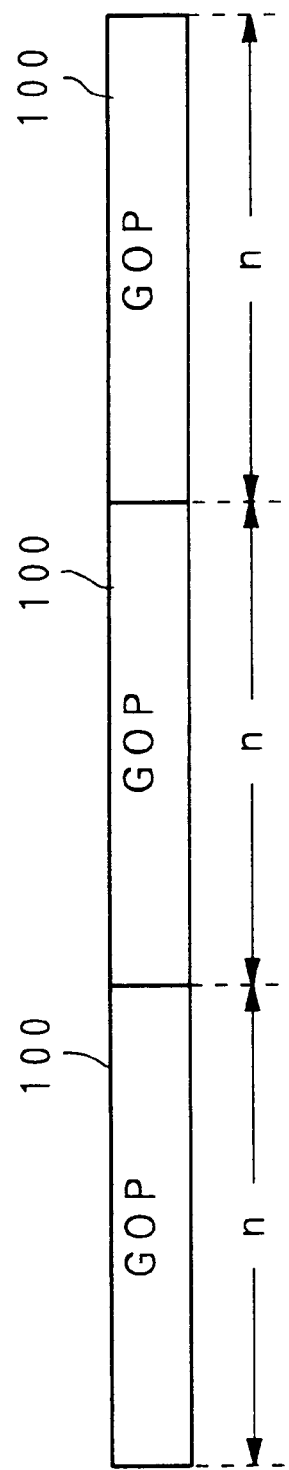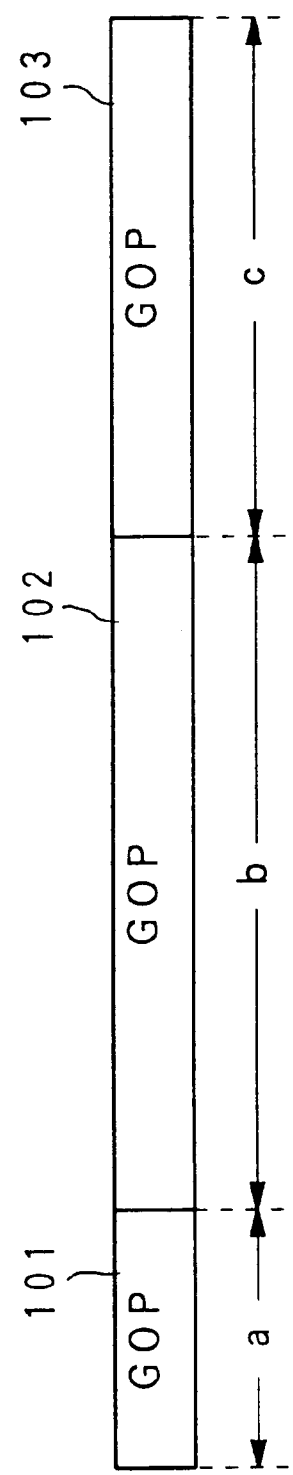

METHOD OF AND APPARATUS FOR RECORDING INFORMATION ON RECORD MEDIUM, AND APPARATUS FOR REPRODUCING THE SAME

This is a continuation of application Ser. No. 08/675,016 filed on Jul. 3, 1996 U.S. Pat. No. 5,892,983.

BACKGROUND OF THE INVENTION

1. Field of the Invention

The present invention generally relates to a method of and an apparatus for recording information on a record medium such as an optical disc, and an apparatus for reproducing the information from the record medium, and more particularly, to an improvement in the access time as for the information recording and reproducing apparatuses.

2. Description of the Related Art

Along with the recent development in the multi-media technique, the high density recording of video and audio information is frequently performed. The high efficiency encoding process of the video and audio information has been developed as a technique to record as much information as possible onto the record medium having a limited record capacity. Especially, the method proposed by the MPEG (Motion Picture Experts Group) that is an international standardization meeting for accumulation medium animation image encoding (hereafter, referred to as an MPEG method) is noted as a standard for the compression method by means of high efficiency encoding of the video information.

In the consecutive frame pictures, the pictures ahead of and behind each other are generally similar to each other. The MPEG method is a method of noting this point and generating, on the basis of a plurality of frame pictures transferred at an interval of a few frames, a different frame picture existing between the pertinent plurality of frame pictures, by means of an interpolation operation based on a moving vector of an original picture and the like.

In this case, in a case of recording the different frame pictures, only by recording information with respect to a difference between the plurality of frame pictures and the moving vector, at a time of reproducing, it is possible to refer to them, predict from the above mentioned plurality of frame pictures and thereby reproduce the appropriate different frame pictures. As a result, it is possible to carry out the compression record of the video data.

Here, in the MPEG method, a unit of GOP (Group of Picture) is used, as a minimum unit which enables a reproduction without referring to other pictures. FIG. 7 shows a bit stream in such a high efficiency encoding process constituting this one GOP. Each frame indicates one frame picture. In FIG. 7, one GOP is composed of twelve sheets of frame pictures. However, in the frame pictures, a frame picture illustrated by a sign (I) is referred to as an I picture (Intra-coded picture), and it means the frame picture which can be reproduced as a perfect frame picture from the picture itself. And, a frame picture illustrated by a sign (P) is referred to as a P picture (Predictive-coded picture), and it is a predictive picture generated by decoding a difference from the predictive pictures which are compensation-reproduced on the basis of a demodulated I picture or other P pictures. And, a frame picture illustrated by a sign (B) is referred to as a B picture (Bidirectionally predictive-coded picture), and it means a predictive picture reproduced by using not only the demodulated I picture or P picture but also a future I picture or P picture recorded on an optical disk and the like to predict. FIG. 7 shows a predictive relation (interpolation relation) between respective pictures by using an arrow mark.

Here, as to data generation amount of one GOP, there are two different generation ways. FIG. 8A shows the GOP recorded by controlling a compression rate and the like such that the data generation amount (n, n, n) for each GOP 100 is always constant. If the data generation amount is constant, an address of each GOP and the data amount have proportional relation between each other. Thus, it is possible to easily search the appropriate address corresponding to a target time. On the other hand, FIG. 8B shows the GOP generated without controlling so as to make the data generation amount constant (a, b, c). At this time, in respective recorded GOPs 101, 102 and 103, the data amounts included therein become different from each other.

Now, noting the data amount generated in a case that recorded video information is reproduced, the picture in which movement of an original picture is large has slightly relative relation between respective pictures, so that the data amount generated in one GOP becomes large. On the other hand, the picture in which the movement of the original picture is slight has largely relative relation between the respective pictures, so that the data amount generated in one GOP becomes small. According to the method shown in FIG. 8A, each GOP is adapted to have always constant data amount irrespective of a content of a moving component of the original picture. Thus, image quality is made worse for the video picture whose movement is large, and uselessness is induced in the video picture whose movement is small. As a result, the method shown in FIG. 8B is desired in order to make the image quality uniform and to effectively utilize a record capacity of the optical disk. It is concluded that it is appropriate to differentiate the data amount for each information unit such as the GOP, in the information recording method by means of the ordinary high efficiency encoding process.

Next, as shown in FIG. 9, when recording on the optical disk the video information compressed, together with audio information to which a predetermined process such as a compression and the like is applied, the compressed video information is time-axis-divided and multiplexed into one data stream. And, the video information and the audio information which are time-division-multiplexed are recorded with a packet data as a unit.

In the multiplexed stream data recorded in this way, as shown in FIG. 10, for the sake of convenience of the access at a time of reproducing, time-axis information is added for every packet. In the MPEG method, this time-axis information is referred to as PTS (Presentation Time Stamp). In the PTS, a reproduction time of the video information or the audio information with respect each of the packets is described with 1/90000 sec as one unit (that is, 90000 (Hz). At a time of multiplexing the video information and the audio information to record, as shown in FIG. 10, the same PTSs are described and recorded on the corresponding video packet and audio packet. Thus, the reproducing apparatus refers to the PTSs and causes the packet of the video information and the packet of the audio information, in which the same PTSs are recorded on both packets, to be synchronized with each other, and thereby can reproduce the video information and the audio information by causing them to be synchronized with each other.

On the other hand, the PTS can be used as elapsed time information at a time of reproducing. That is, by storing the PTS obtained from the optical disk at a time of starting the reproduction, by obtaining a difference between the PTS detected in a middle of the reproduction and the PTS at the time of starting the reproduction, and by dividing the difference by 90000 (=90[kHz]), it is possible to obtain the elapsed time from the beginning of the reproduction.

However, in case of the recording method of FIG. 8B in which the data amounts are different in each GOP, there is a problem that it takes a relatively long time until the reproducing apparatus starts reproducing the target information since the arbitrary time to specify the target information is specified to the reproducing apparatus. Hereinbelow, this problem will be explained in more detail.

In the above mentioned information reproducing apparatus, when the target time is given to it, it refers to the time axis information e.g. the PTS, and then accesses the information according to a predetermined procedure.

Namely:

i) it accesses the lead address of the record medium;

ii) it judges the approximate position from the specified target time, and slides the optical pickup device to the approximate position;

iii) it reproduces the information from the position to which the optical pickup has been slid, and detects the PTS thereat; and iv) it calculates the elapsed time from the detected PTS, judges the approximate position again from the difference between the calculated elapsed time and the target time, and slides the optical pickup device again to the approximate position; and v) it repeats the above processes i) to iv) until it accomplishes a convergence at the target position.

That is why it takes a certainly long time to accomplish the convergence.

There are some methods to reduce the access time.

For example, there is a method of dividing the software to be recorded onto the record medium into a certain number of chapters depending on the content of the software, and recording the lead address of each chapter at a predetermined portion on the record medium. According to this method, the compressed and multiplexed video information and the multiplexed audio information are recorded in the video and audio information area in FIG. 11A, while the lead address of each chapter is recorded in the access information area, which is located at the inner circumference side of the record medium, in FIG. 11A. Here, by dividing the compressed information by each block (corresponding to the chapter) of 2048 bytes, the serial number from the lead of each block may be assigned to the address for each block, for example. The access information based on this method is shown in FIG. 11B.

Further, other than the above mentioned methods, there is a method of calculating the data amount for each GOP in a recording apparatus, and recording all of the lead addresses of GOPs to the access information area. The access information based on this method is shown in FIG. 11C.

However, according to the method by use of the access information of FIG. 11B, the access time can be reduced by the time period corresponding to the lead address of each chapter. Namely, in order to access the address corresponding to the target time specified arbitrarily, the aforementioned processes i) to iv) should be performed.

On the other hand, according to the method by use of the access information of FIG. 11C, if the number of frames constituting the GOP is changed in the middle of the record medium, the elapsed time for each start address is also changed, resulting in that it is difficult to search the address precisely when the target time is specified.

SUMMARY OF THE INVENTION

It is therefore an object of the present invention to provide a method of and apparatus for recording information onto a record medium, and an apparatus for reproducing the record medium, which enables a rapid random accessing of the recorded information.

The above object of the present invention can be achieved by a first recording method of recording information on a record medium. The first recording method is provided with the steps of: generating a start address of each time-unit piece of main information divided by a predetermined time unit based on time information corresponding to the main information; coding and compressing the main information by every predetermined compression unit to generate a plurality of compression-unit pieces of compressed data: and recording the plurality of compression-unit pieces of compressed data and the generated start address of each time-unit piece of main information as at least a portion of access information for the main information, onto the record medium.

According to the first recording method, the start address of each time-unit piece of main information divided by a predetermined time unit (e.g. 10 seconds) based on time information corresponding to the main information is generated. Then, the main information is coded and compressed, by every predetermined compression unit (e.g. GOP), so that a plurality of compression-unit pieces of compressed data are generated. Then, the plurality of compression-unit pieces of compressed data and the generated start address as at least a portion of access information for the main information are recorded onto the record medium. Accordingly, at a time of reproducing the record medium recorded in the above described first recording method, the access information is firstly reproduced and stored in a memory device. Thus, by use of the start address of each time-unit piece of the main information, the start address of the time-unit piece of the main information including the address to be accessed is specified. Then, the vicinity of the target time is accessed, and that the compression-unit piece of compressed data including the target time can be identified. Therefore, the speedy random access on the record medium is realized by the first record method of the present invention.

In one aspect of the first method of the present invention, in the generating step, a start address of each compression-unit piece of compressed data is further generated on the basis of a data amount of every predetermined compression unit, and in the recording step, the generated start address of each compression-unit piece of compressed data is further recorded as another portion of the access information.

According to this aspect, the start address of each compression-unit piece of compressed data is generated on the basis of a data amount of every predetermined compression unit, and is recorded as another portion of the access information besides the start address of each time-unit piece of the main information. Accordingly, at a time of reproducing the record medium recorded in this manner, the access information is firstly reproduced and stored in a memory device. Thus, by use of the start address of each time-unit piece of the main information, the start address of each time-unit piece of the main information including the address to be accessed is specified. Further, by use of the start address of each compression-unit piece of compressed data included in the access information, the compression-unit piece of compressed data, which includes the address corresponding to the target time, is specified within the specified time-unit piece of the main information. Finally, the main information corresponding to the target time can be reproduced.

In another aspect of the first method of the present invention, in the recording step, the portion of access information is recorded to a lead-in area of the record medium.

According to this aspect, at the beginning of reproducing the record medium recorded in this manner, the access information can be firstly and easily reproduced from the lead-in area. Thus, by storing the firstly reproduced access information in a memory device, the random access based on the access information can be speedily and easily performed.

The above object of the present invention can be also achieved by a second recording method of recording information on a record medium. The second recording method is provided with the steps of: coding and compressing main information by every predetermined compression unit to generate a plurality of compression-unit pieces of compressed data; generating a start address of each compression-unit piece of compressed data on the basis of a data amount of every predetermined compression unit; counting the number of frames constituting each compression-unit piece of compressed data; and recording the plurality of compression-unit pieces of compressed data, and the generated start address of each compression-unit piece of compressed data and the counted number of frames as at least a portion of access information for the main information, onto the record medium.

According to the second recording method of the present invention, the main information is coded and compressed by every predetermined compression unit, so that a plurality of compression-unit pieces of compressed data are generated. A start address of each compression-unit piece of compressed data is generated on the basis of a data amount of every predetermined compression unit. The number of frames constituting each compression-unit piece of compressed data is counted. Then, the plurality of compression-unit pieces of compressed data, and the generated start address of each compression-unit piece of compressed data, and the counted number of frames as at least a portion of access information for the main information is recorded onto the record medium. Accordingly, at a time of reproducing the record medium recorded in the above described second recording method, the access information is firstly reproduced and stored in a memory device. Thus, by use of the start address of each compression-unit piece of compressed data and the number of frames constituting each compression-unit piece of compressed data, the start address of the compression-unit piece of compressed data including the address to be accessed is specified. Then, the main information is outputted from the address to be accessed by reproducing the specified compression-unit piece of compressed data. Namely, the compression-unit piece of compressed data just before the target time can be specified by use of the number of frames of each compression-unit piece of compressed data, which is included in the access information. Therefore, the speedy random access on the record medium is realized by the second record method of the present invention.

In one aspect of the second method of the present invention, wherein, in the recording step, the portion of access information is recorded to a lead-in area of the record medium.

The above object of the present invention can be also achieved by a first recording apparatus for recording information on a record medium. The first recording apparatus is provided with: a controller for generating a start address of each time-unit piece of main information divided by a predetermined time unit based on time information corresponding to the main information; a processing device for coding and compressing the main information by every predetermined compression unit to generate a plurality of compression-unit pieces of compressed data; and a recording device for recording the plurality of compression-unit pieces of compressed data and the generated start address of each time-unit piece of main information as at least a portion of access information for the main information onto the record medium.

According to the first recording apparatus of the present invention, the start address of each time-unit piece of main information divided by a predetermined time unit based on time information corresponding to the main information is generated by the controller. The main information is coded and compressed by the processing device by every predetermined compression unit, so that a plurality of compression-unit pieces of compressed data are generated. The plurality of compression-unit pieces of compressed data and the generated start address of each time-unit piece of main information as at least a portion of access information for the main information are recorded onto the record medium by a recording device.

Consequently, the aforementioned first recording method can be certainly performed by the first recording apparatus of the present invention.

In one aspect of the first recording apparatus of the present invention, the first recording apparatus is further provided with a memory device for storing the generated compression-unit pieces of compressed data, the recording device recording the compression-unit pieces of compressed data stored in the memory device.

According to this aspect, the compression-unit pieces of compressed data can be recorded efficiently from the memory device, by the recording device.

In another aspect of the first recording apparatus of the present invention, the controller further generates a start address of each compression-unit piece of compressed data on the basis of a data amount of every predetermined compression unit, and the recording device further records the generated start address of each compression-unit piece of compressed data as another portion of the access information.

According to this aspect, at a time of reproducing the record medium, the access information is firstly reproduced and stored in a memory device. Thus, by use of the start address of each time-unit piece of the main information, the start address of each time-unit piece of the main information including the address to be accessed is specified. Further, by use of the start address of each compression-unit piece of compressed data included in the access information, the compression-unit piece of compressed data, which includes the address corresponding to the target time, is specified within the specified time-unit piece of the main information. Finally, the main information corresponding to the target time can be reproduced.

In this aspect, the first recording apparatus may be further provided with a memory device for storing the data amount of every predetermined compression unit, the controller generating the start address of each compression-unit piece of compressed data on the basis of the data amount stored in the memory device.

In this case, the controller can efficiently and reliably generates the start address of each compression-unit piece of compressed data by use of the data amount stored in the memory device.

In another aspect of the first recording apparatus of the present invention, the recording device records the portion of access information to a lead-in area of the record medium.

The above object of the present invention can be also achieved by a second recording apparatus for recording information on a record medium. The second recording apparatus is provided with: a processing device for coding and compressing main information by every predetermined compression unit to generate a plurality of compression-unit pieces of compressed data; a controller for generating a start address of each compression-unit piece of compressed data on the basis of a data amount of every predetermined compression unit, and for counting the number of frames constituting each compression-unit piece of compressed data; and a recording device for recording the plurality of compression-unit pieces of compressed data, and the generated start address and the counted number of frames as at least a portion of access information for the main information onto the record medium.

According to the second recording apparatus of the present invention, the main information is coded and compressed by a processing device by every predetermined compression unit, so that a plurality of compression-unit pieces of compressed data are generated. A start address of each compression-unit piece of compressed data is generated by a controller on the basis of a data amount of every predetermined compression unit. Along with this, the number of frames constituting each compression-unit piece of compressed data is counted by the controller. The plurality of compression-unit pieces of compressed data, and the generated start address of each compression unit piece of compressed data and the counted number of frames as at least a portion of access information for the main information, are recorded onto the record medium by the recording device.

Consequently, the aforementioned second recording method can be certainly performed by the second recording apparatus of the present invention.

In one aspect of the second recording apparatus of the present invention, the second recording apparatus is further provided with a memory device for storing the generated compression-unit pieces of compressed data, the controller counting the number of frames constituting each compression-unit piece of compressed data stored in the memory device, the recording device recording the compression-unit pieces of compressed data stored in the memory device.

According to this aspect, the compression-unit pieces of compressed data can be recorded efficiently from the memory device.

In another aspect of the second recording apparatus of the present invention, the second recording apparatus is further provided with a memory device for storing the data amount of every predetermined compression unit, the controller generates the start address of each compression-unit piece of compressed data on the basis of the data amount stored in the memory device.

According to this aspect, the controller can efficiently and reliably generates the start address of each compression-unit piece of compressed data by use of the data amount stored in the memory device.

In another aspect of the second recording apparatus of the present invention, the recording device records the portion of access information to a lead-in area of the record medium.

The above object of the present invention can be also achieved by a first reproducing apparatus for reproducing information from a record medium, on which a plurality of compression-unit pieces of compressed data, which are generated by coding and compressing main information by every predetermined compression unit, and access information for the main information, the access information including a start address of each time-unit piece of main information divided by a predetermined time unit based on time information corresponding to the main information. The first reproducing apparatus is provided with: a reproducing device for reproducing information from anarbitrary position on the record medium; a memory device for storing the access information reproduced by the reproducing device; a specifying device for specifying a start address of the time-unit piece to which an address to be accessed is included, on the basis of a target time appointed from the external and the start address of each time-unit piece of the main information included in the stored access information; and an address searching device for accessing the start address of the time-unit piece specified by the specifying device and searching the main information from the accessed time unit.

According to the first reproducing apparatus of the present invention, firstly, the access information is reproduced by the reproducing device, and is stored into the memory device. Then, when a target time is specified from the external by the user, a start address of the time-unit piece of main information, to which an address to be accessed is included, is specified by a specifying device, on the basis of a target time appointed from the external and the start address of each time-unit piece of the main information included in the stored access information. For example, the target time is divided by the predetermined time unit, so that the quotient m and remainder n are obtained, wherein the quotient m corresponds to the block number until the time-unit piece of the main information including the target time. Then, by referring to the start address of the $m^{th}$ time-unit piece of the main information specified by-the specifying device, for example, it is accessed by the address searching device. Finally, the main information corresponding to the target time is searched. In this manner, the vicinity of the target time is firstly accessed, and then the compression-unit piece of compressed data including the target time can be identified. Therefore, the speedy random access on the record medium is realized by the first record method of the present invention.

In one aspect of the first reproducing apparatus of the present invention, a start address of each compression-unit piece of compressed data is further recorded as another portion of the access information. The specifying device further specifies the compression-unit piece of compressed data, which includes the address corresponding to the appointed target time, within the specified time unit, on the basis of the start address of each compression-unit piece of compressed data included in the stored access information. The address searching device accesses the specified compression-unit piece of compressed data, and outputs the information from the address to be accessed within the reproduced compression-unit piece of compressed data.

According to this aspect, the compression-unit piece of compressed data, which includes the address corresponding to the appointed target time, within the specified time-unit piece of main information is further specified by the specifying device, on the basis of the start address of each compression-unit piece of compressed data included in the stored access information. For example, depending upon the value of the remainder n, the jumping search process is performed by the compression unit, and the time axis information included in the compression-unit piece of compressed data is referred to, so that the searching process is repeatedly performed until it matches the target. The specified compression-unit piece of compressed data is accessed by the address searching device. For example, the address can be judged by the reminder n and the time axis information. Then, the information is outputted by the address searching device from the address to be accessed within the reproduced compression-unit piece of compressed data. Therefore, the speedy random access on the record medium is realized by the first reproducing apparatus of the present invention.

The above object of the present invention can be also achieved by a second reproducing apparatus for reproducing information from a record medium, on which a plurality of compression-unit pieces of compressed data, which are generated by coding and compressing main information by every predetermined compression unit, and access information for the main information, the access information including a start address of each compression-unit piece of compressed data and the number of frames constituting each compression-unit piece of compressed data. The second reproducing apparatus is provided with: a reproducing device for reproducing information from an arbitrary position on the record medium; a memory device for storing the access information reproduced by the reproducing device; a specifying device for specifying a start address of the compression-unit piece of compressed data to which an address to be accessed is included, on the basis of a target time appointed from the external and the number of frames included in the stored access information; and an address searching device for accessing the start address of the compression-unit piece of compressed data specified by the specifying device, and outputting the main information from the address to be accessed within the reproduced compression-unit piece of compressed data.

According to the second reproducing apparatus of the present invention, firstly, the access information is reproduced by the reproducing device, and is stored into the memory device. Then, when a target time is specified from the external by the user, a start address of the compression-unit piece of compressed data to which an address to be accessed is included, is specified by the specifying device, on the basis of a target time appointed from the external and the number of frames included in the stored access information. For example, the number of frames of each compression-unit piece of compressed data may be accumulated, so that the compression-unit piece of compressed data, which is the closest to the target time but not exceeding the target time, is specified. Then, the start address of the compression-unit piece of compressed data specified by the specifying device is referred to and accessed. Finally, the main information is outputted from the address to be accessed within the reproduced compression-unit piece of compressed data. For example, the time difference between the target time and the elapsed time period, which corresponds to the start address of the compression-unit piece of compressed data, is calculated, so that the number of frames from the lead of the compression-unit piece of compressed data to the target time is calculated. Then, the number of frames from the lead of the reproduced compression-unit piece of compressed data is calculated, and the output of the main information is started when the frame (NO. j−1) immediately previous to the frame (No.j) corresponding to the calculated difference is reproduced. In this manner, by use of the number of frames of each compression-unit piece of compressed data, the compression-unit piece of compressed data just previous to the target time can be identified. Therefore, the speedy random access on the record medium is realized by the second reproducing apparatus of the present invention. The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing one example of data construction of access information used in a first embodiment;

FIG. 5 is a diagram showing another example of data construction of access information used in a second embodiment;

FIGS. 8A and 8B are diagrams showing data generation amount of the GOP, wherein FIG. 8A is a diagram showing a case where the data generation amount of each GOP is constant, and FIG. 8B is a diagram showing a case where the data generation amount of each GOP is variable;

FIGS. 11A, 11B and 11C are diagrams showing the address information, wherein FIG. 11A is a diagram showing a case where the access information is recorded in the access information area, FIG. 11B is a diagram showing a case where the start address of each chapter is recorded in each chapter, and FIG. 11C is a diagram showing a case where the GOP start address of each GOP is recorded in each GOP.

DETAILED DESCRIPTION OF THE PREFERRED EMBODIMENTS

Referring to the accompanying drawings, embodiments of the present invention will be now explained.

(I) First Embodiment

Constructions and operations of the information recording apparatus and the information reproducing apparatus in the first embodiment are explained with reference to FIGS. 1 to 4.

(i) Information Recording Apparatus

At first, the construction of the information recording apparatus according to the embodiment is explained with reference to FIG. 1.

Figure 1:
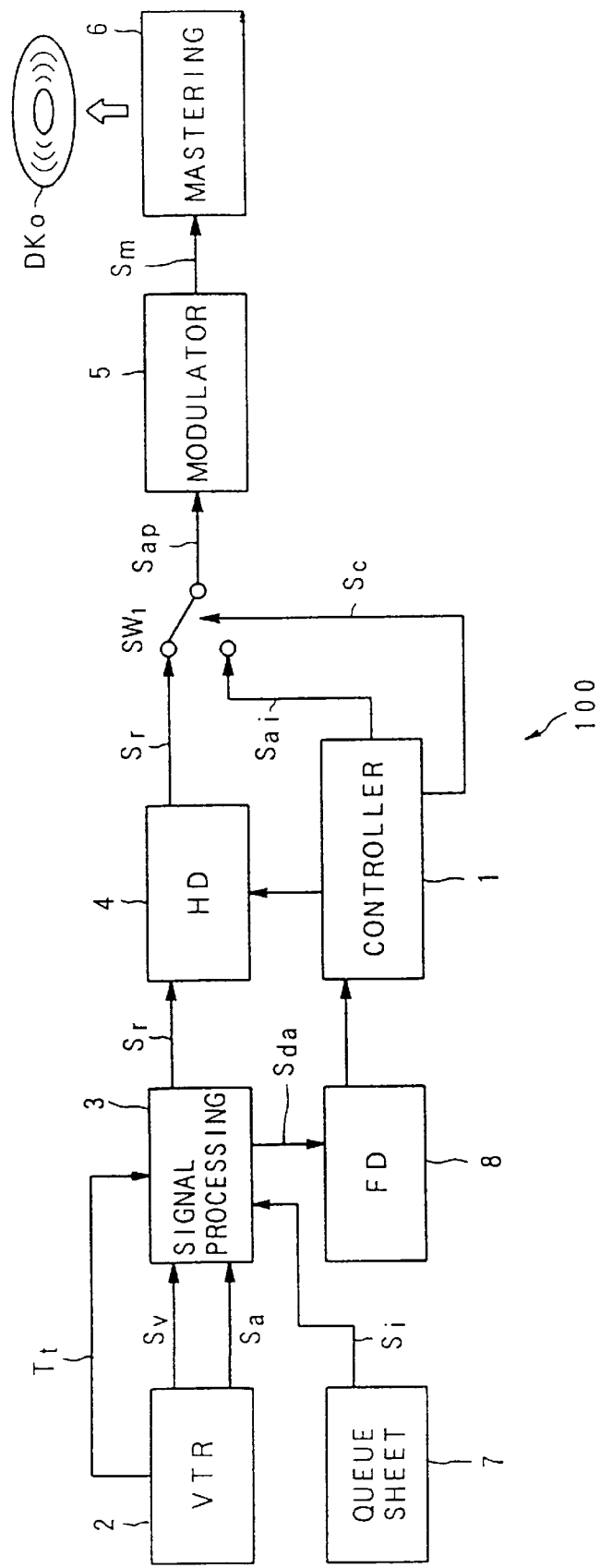
FIG.1 is a block diagram which shows a schematic configuration of an information recording apparatus as an embodiment of the present invention.

As shown in FIG. 1, the information recording apparatus 100 according to the embodiment is constructed to record video information and audio information by every signal compression unit, to an original disk DKo, which comprises a glass material etc. and which becomes a master disk for manufacturing (i.e. replicating) a plurality of replica disks. In place of the original disk DKo, a record medium which is capable of recording and reproducing the information by itself, such as a magneto-optical disk, may be used.

More concretely, in FIG. 1, the information recording apparatus 100 is provided with a controller 1, a VTR (Video Tape Recorder) 2, a signal processing section 3, a hard disk (HD) device 4, a switch SW1, a modulator 5, a mastering device 6, a queue sheet 7 and a floppy disk (FD) device 8.

The controller 1 carries out an overall control of the information recording apparatus 100. Especially, the controller 1 refers to the time information from the signal processing section 3 through the floppy disk device 8 and generates an access information. The generated access information is stored in an internal RAM (Random Access Memory) within the controller 1, and is outputted as access information signal Sai.

The switch SW1 switches the access information signal Sai supplied from the side of the controller 1 and the packet data i.e. compression multiplexed signal Sr accumulated in and outputted from the hard disk device 4 to each other, so as to output an information addition multiplexed compression signal Sap.

The VTR 2, which is a business use VTR of 1 inch type for example, reproduces the software to be recorded onto the original disk DKo, outputs a video signal Sv and an audio signal Sa, and also outputs a time code Tt corresponding to those signals.

Figure 9:
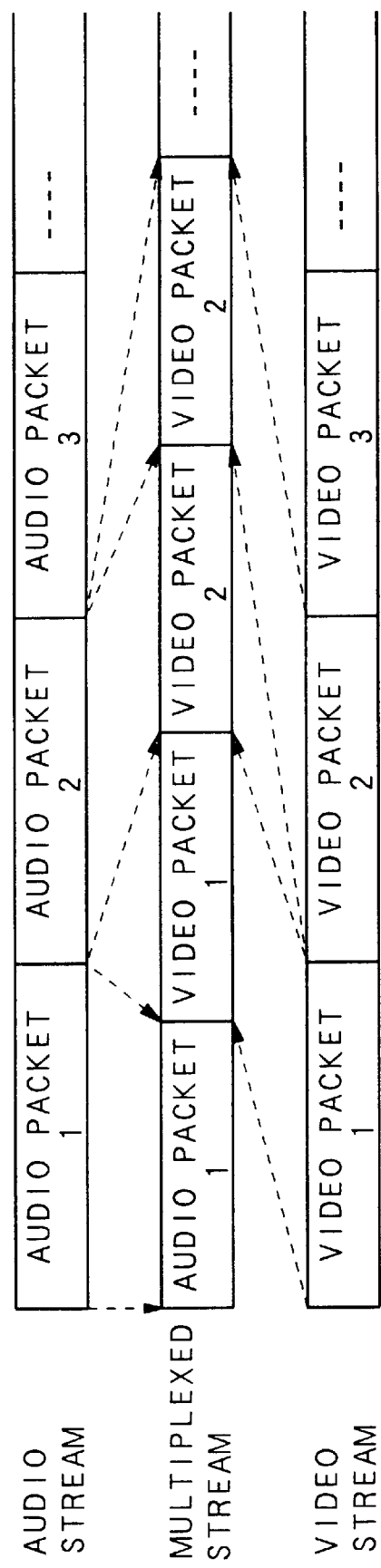
FIG. 9 is a diagram for explaining a generation of multiplexed stream.
Figure 10:
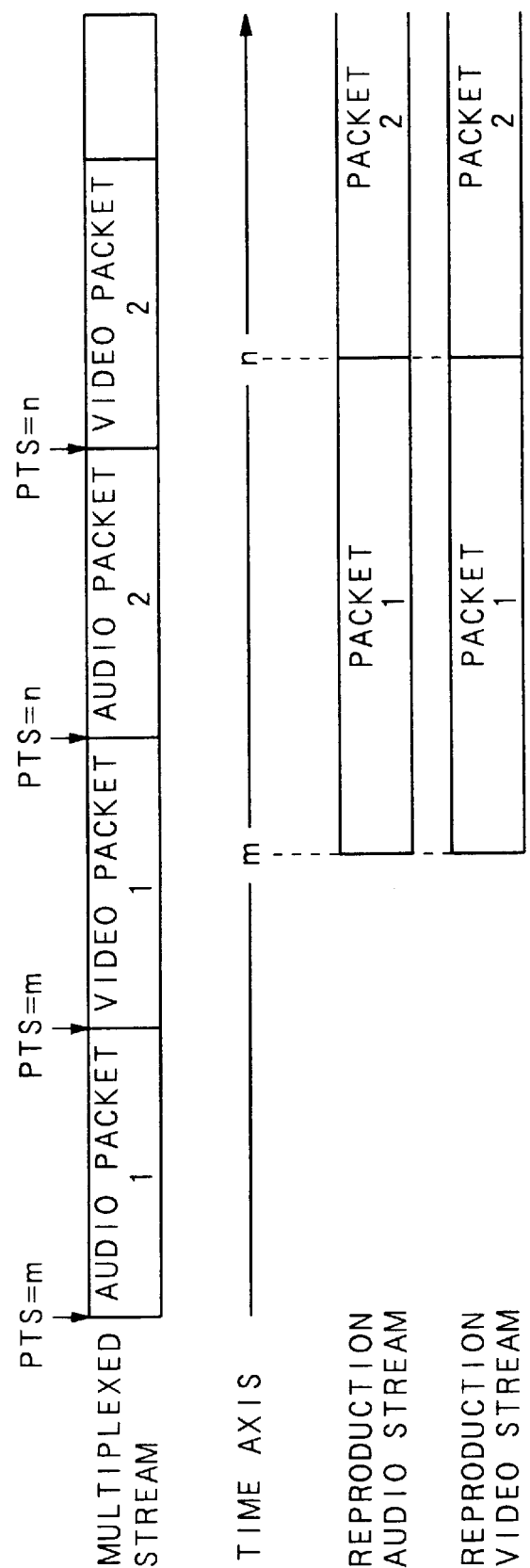
FIG.10 is a diagram for explaining a synchronization between a video stream and an audio stream.
Figure 11A:
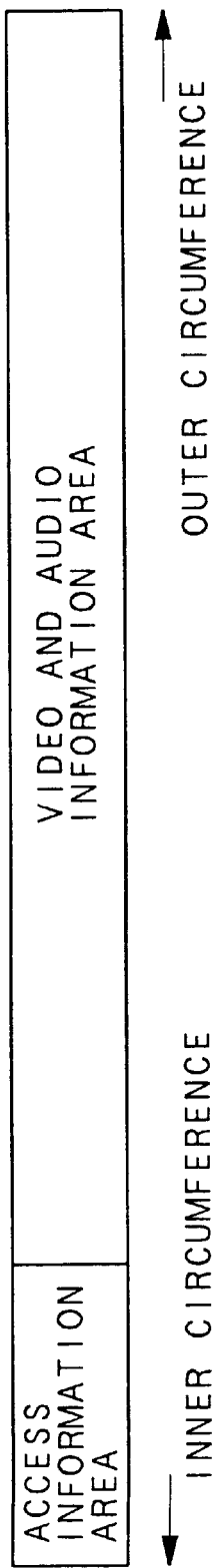
Figure 11B:
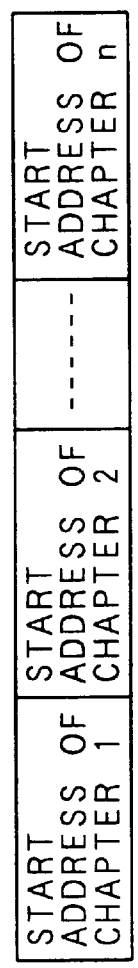
Figure 11C:
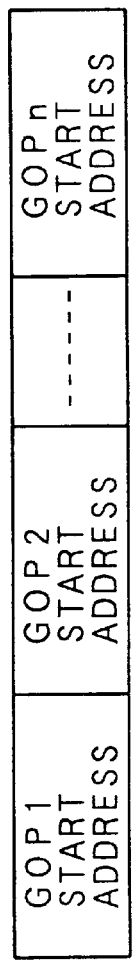

The signal processing section 3 performs a predetermined signal process with respect to the video signal Sv. As the signal process performed here, the high efficiency encoding process based on the MPEG standard etc., which compresses the video signal Sv, may be performed. A predetermined compressing process may be also performed with respect to the audio signal Sa. The compressed video signal Sv and the audio signal Sa are time-divided and multiplexed to be the compression multiplexed signal Sr, corresponding to the multiplexed stream as shown in FIG. 9. Then, the compression multiplexed signal Sr is temporarily stored in the hard disk device 4. The signal processing section 3 also outputs a data amount signal Sda, which indicates a data amount of the signal compression unit for each data generated by the signal processing section 3.

The hard disk device 4 temporarily stores the compression multiplexed signal Sr.

The switch SW1 adds the access information signal Sai to the appropriate compression multiplexed signal Sr, on the basis of an information selecting signal Sc supplied from the controller 1, to output the information addition multiplexed compression signal Sap.

The modulator 5 interleaves the information addition multiplexed compression Sap supplied from the switch SW1. The modulator 5 also adds an error correction code (ECC), such as a REED SOLOMON sign and the like, onto the interleaved data array, and further modulates it by a modulation method such as an 8 to 15 modulation method and the like. In this manner, the modulator 5 generates a disk record signal Sm.

The queue sheet 7 includes information as for the content of the software to be recorded, which is inputted as a content information signal Si to the signal processing section 3 so as to perform the appropriate signal process.

The floppy disk device 8 temporarily stores the data amount information indicating the data amount for every compression unit outputted from the signal processing section 3, which is referred to as the data amount signal Sda by the controller 1 when the access information are generated.

The floppy disk device 8 and the hard disk device 4 may be any writable type of memory device, such as a RAM, a magneto-optical disk device and the like.

The mastering device 9 performs cutting the original disk DKo in accordance with ON/OFF of the disk record signal Sm so that the original disk DKo becomes a master disk (a punching die) at a time of fabricating (i.e. replicating) a plurality of optical disks.

(ii) Information Reproducing Apparatus

Next, the construction of the information reproducing apparatus according to the embodiment is explained with reference to FIG. 2.

Figure 2:
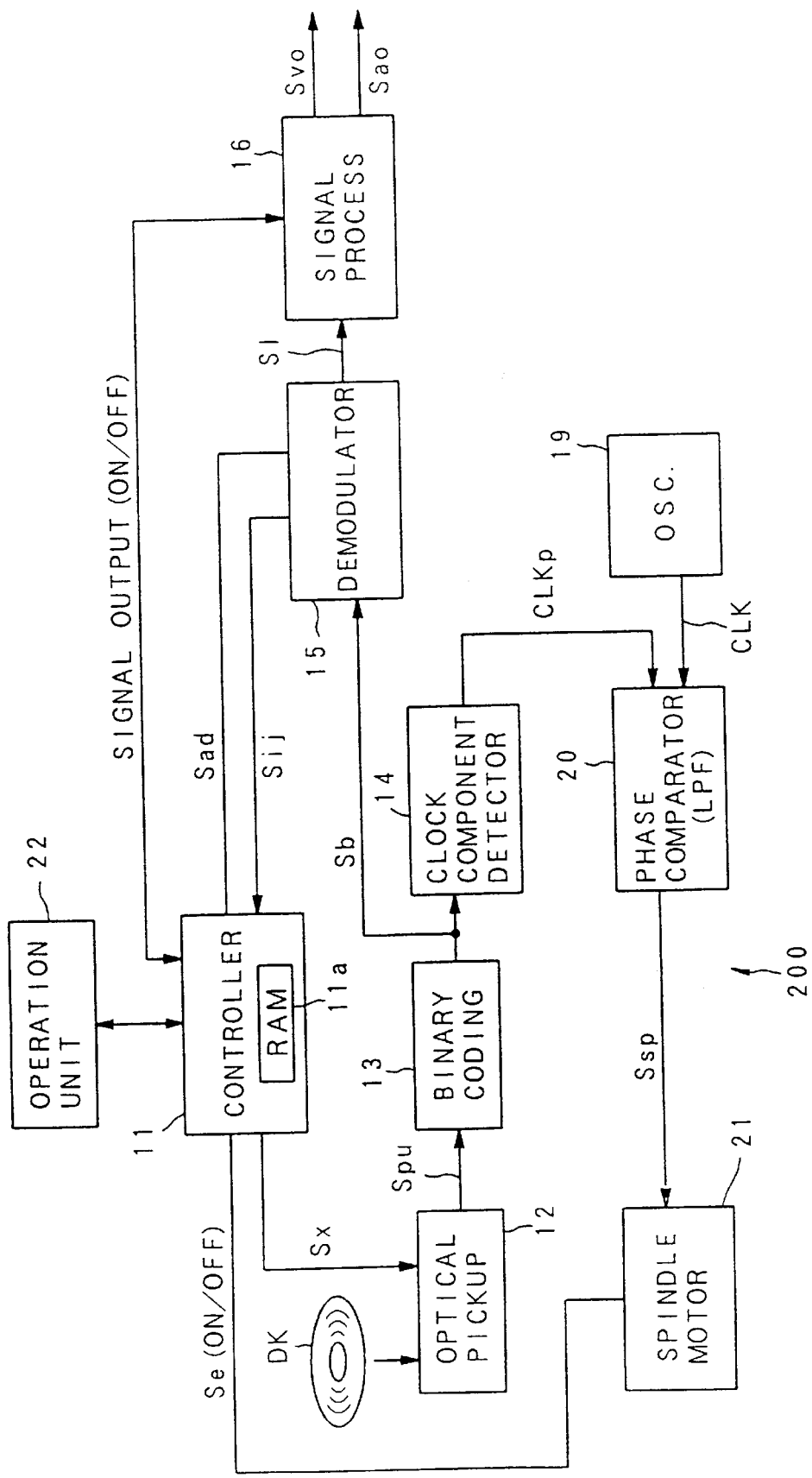
FIG.2 is a block diagram which shows a schematic configuration of an information reproducing apparatus as the embodiment.

As shown in FIG. 2, the information reproducing apparatus 200 according to the embodiment is constructed to reproduce the information from an optical disk DK replicated from the master disc i.e. the original disk DKo to which the information has been recorded by the aforementioned information recording apparatus 100.

More concretely, in FIG. 2, the information reproducing apparatus 200 is provided with: a controller 11, an optical pickup 12, a binary coding device 13, a clock component detector 14, a demodulator 15, a signal processing section 16, an oscillator (OSC) 19, a phase comparator (LPF) 20, a spindle motor 21 and an operation unit 22.

The controller 11 carries out a whole control of the information reproducing apparatus 200. Especially, the controller 11 controls the optical pickup 12 and the demodulator 15 to reproduce an access information signal Sij and the PTS which is in the packet data, from the optical disk DK. The access information signal Sij reproduced from the optical disk DK is stored in an internal RAM 11a within the controller 11. By using this access information signal Sij, on the basis of an address signal Sad corresponding to an address of a presently reproduced record information, which is outputted from the demodulator 15, the controller 11 outputs a spindle control signal Se and a slider control signal Sx to reproduce the partial record information corresponding to the reproduction position, which is specified by the operation unit 22 according to the switch operation by the user, for example.

The optical pickup 12 detects the disk record signal Sm from the optical disk DK and outputs it as a detection signal Spu which is the blunt RF (Radio Frequency) signal.

The binary coding device 13 converts the read detection signal Spu having a blunt signal form into a binary value on the basis of a constant threshold and outputs it as a binary signal Sb.

The clock component detector 14 extracts a clock component from the binary signal Sb, and outputs it as a detection clock signal CLKp. The oscillator 17 outputs a standard clock signal CLK to set a timing synchronization between respective elements constituting the information reproducing apparatus 200.

A phase lock loop to stabilize the clock is provided with: the clock component detector 14; the phase comparator 20 including a LPF (Low Pass Filter) for phase-comparing the detection clock signal CLKp with the standard clock signal CLK from the oscillator 19 and extracting the low frequency component from a phase 27 comparison signal, to output it as a rotation number control signal Ssp for the spindle motor 16; the spindle motor 21; the optical pickup 12; and the binary coding device 13.

The spindle motor 16 rotates the optical disk DK under the rotation number control based on the rotation number control signal Ssp.

The demodulator 15, which is a reproducing means, applies a demodulation process, an error correction process and a de-interleaving process, to the binary signal Sb, so as to demodulate the digital data to the packet data, i.e. output the result as a demodulation signal Sl. The demodulator 12 extracts the construction addition information signal Sij, which corresponds to the construction addition information IJ, and the address signal Sad, which corresponds to the address of a presently reproduced record information, from the binary signal Sb to output those signals to the controller 11.

The signal process section 16, which has a demultiplexer, the MPEG decoder etc., carries out an extending process for the demodulation signal Sl by means of the MPEG method, and outputs it as an output video signal Sao and an output video signal Svo.

The operation unit 22 is provided with various operation switches, by which the user can specify various information and instruction such as a target time for the random access, a search operation, a scan operation, a start and a stop for reproduction and so on, and a display panel to indicate various information as for the condition of the reproducing apparatus 200.

(iii) Recording Operation

Next, a recording operation of the aforementioned information recording apparatus 100 according to the embodiment is explained with reference to FIG. 3.

In the information recording apparatus 100, the signal processing section 3 applies the compression process etc. to the video signal Sv and the audio signal Sa to time-division-multiplexing them, and stores to the floppy disk device 8 the data amount information indicating the generated data amount for each compression unit, each time when the signal processing section 3 outputs the packet data to the hard disk device 4. At the same time, the signal processing section 3 receives the information related to the content of the software from the queue sheet 7, and determines the parameter as for the compression and multiplexing process by use of this received information and the time code Tt outputted from the VTR 2. This parameter is used for the calculation of the address.

When the reproduction of the whole software by the VTR 2 and the generation of the compression signal by the signal processing section 3 are completed, the controller 1 refers to the compression signal accumulated in the hard disk device 4, while reading out the data amount signal Sda from the floppy disk device 8, so as to calculate the start address for each compression unit. The controller 1 also calculates the start address of the data for each predetermined time unit (e.g. 10 seconds) by use of a block, which is obtained by dividing the compression signal accumulated in the hard disk device 4 by the predetermined time unit from it lead side, as a unit.

FIG. 3 shows a data construction of the access information generated by the above described manner.

In FIG. 3, each start address of the GOP1, GOP2, ..., GOPm, is recorded collectively in one portion of the access information 301, and each start address of the time unit 1, 2, ... n, is recorded collectively in another portion of the access information 301. The access information 301 is recorded to the most inner circumference side (i.e. the lead-in area) of the original disk DKo, for example. The original disk DKo is used as a stamper in the replica disk manufacturing process, and a number of optical disks having the same information content are manufactured.

(iv) Reproducing Operation

Next, a reproducing operation of the aforementioned information reproducing apparatus 200 according to the embodiment is explained with reference to FIG. 4, which is an operation flow chart thereof.

Figure 4:
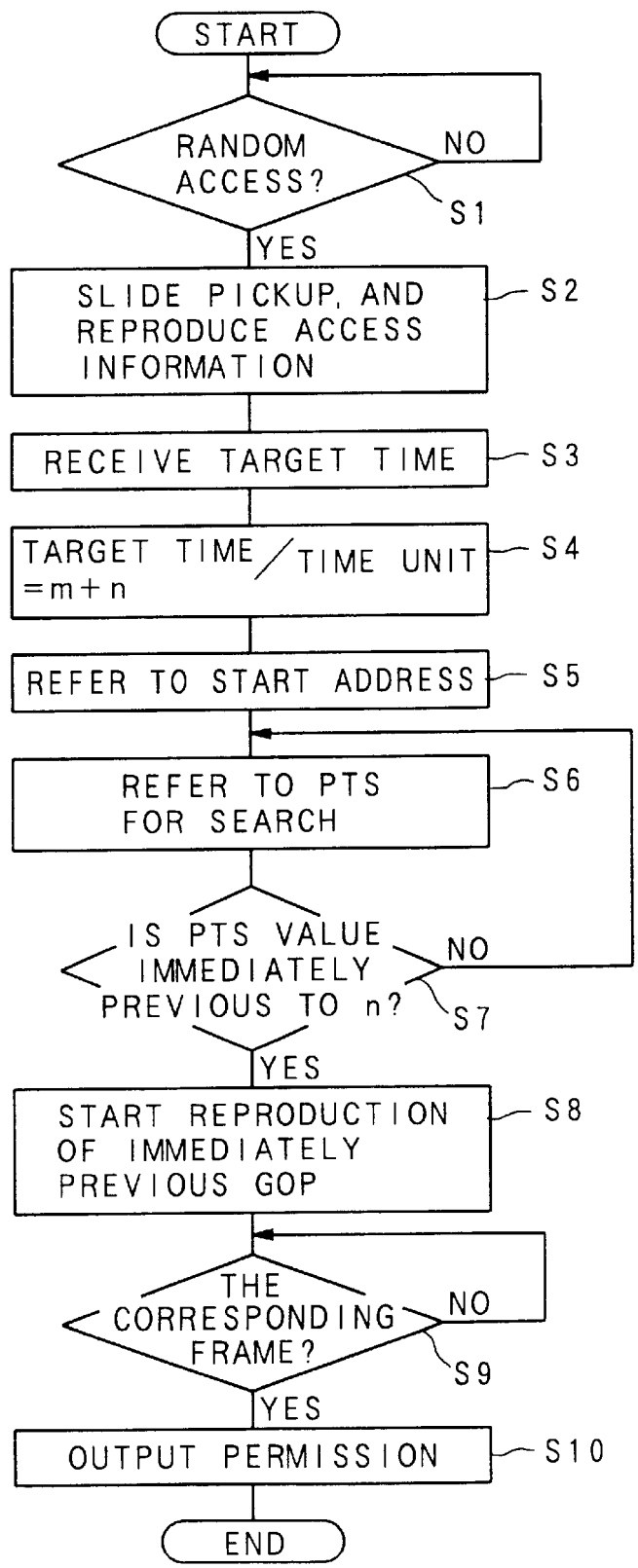
FIG. 4 is a flow chart of one example of reproducing operation in the first embodiment.

In FIG. 4, when the random access is specified by the operation unit 22 (step S1: YES), the optical pickup 12 is slid to the most inner circumference side of the optical disk DK and the access information thereat is reproduced under the control of the controller 11 (step S2). The target time is received by the controller 11 via the operation unit 22 or from the internal memory of the controller 11, to which the target time has been stored beforehand (step S3).

The controller 11 divides the received target time by the predetermined time unit used for the optical disk DK (e.g. 10 seconds in case that the address information recorded on the optical disk DK has been calculated by the time unit of 10 seconds), so as to obtain the quotient m and the remainder n (step S4). The quotient m indicates that the block data of the $m^{th}$ time unit is the block data as for the time unit immediately previous to the time unit including the target time. Thus, the start address as for the $(m+1)^{th}$ time unit is referred to (step S5).

The access is started from this referred start address, and the PTS for search attached to each packet data is inputted and referred to (step S6). The remainder n of the dividing calculation at the step S4 is equivalent to the reproduction time from the lead of the pertinent time unit to the target time. Therefore, the searching of the compression unit is continued until the inputted PTS reaches the value immediately previous to the remainder time n (step S7: NO). When it reaches to the value immediately previous to the remainder time n (step S7: YES), the reproduction of the packet header thereat is started (step S8).

Since there may be a case where the address corresponding to the target time starts from the frame positioned in the middle of one compression unit (i.e. the GOP unit), it waits for the reproduction of the frame corresponding to the target time (step S9: NO). At the time when a frame immediately previous to the corresponding frame is reproduced (step S9: YES), the signal output of the video signal Sv and the audio signal Sa is permitted (turned ON) to the signal processing section 16.

As described above, the controller 11 recognizes the position, on the optical disk DK, of the data for each time unit in advance, a speedy search operation is possible. Since the searching process by the compression unit at the step S6 is the search within the time unit which is relatively short, the searching process can be completed within the time period shorter than the aforementioned searching process.

(II) Second Embodiment

Constructions of the information recording apparatus and the information reproducing apparatus in the second embodiment are the same as those in the first embodiment shown in FIGS. 1 and 2 respectively. The operation of the second embodiment will be explained here with reference to FIGS. 5 and 6.

In the second embodiment, the controller 1 of the information recording apparatus 100 calculates the number of frames constituting each GOP, in place of the start address of each time unit calculated in the first embodiment, at a time of calculating the access information from the data amount information stored in the floppy disk device 8. The number of frames constituting each GOP is stored in the floppy disk device 8 together with the data amount information. The calculated number of frames constituting each GOP is recorded to the most inner circumference side of the original disk DKo together with the start address of each GOP as shown in FIG. 5, for example.

In FIG. 5, each start address of the GOP1, GOP2, ..., GOPm is recorded collectively in one portion of the access information 302, and each number of frames of the GOP1, GOP2, . . . , GOPm is recorded collectively in another portion of the access information 302. The access information 302 is recorded to the most inner circumference side (i.e. the lead-in area) of the original disk DKo, for example.

Figure 6:
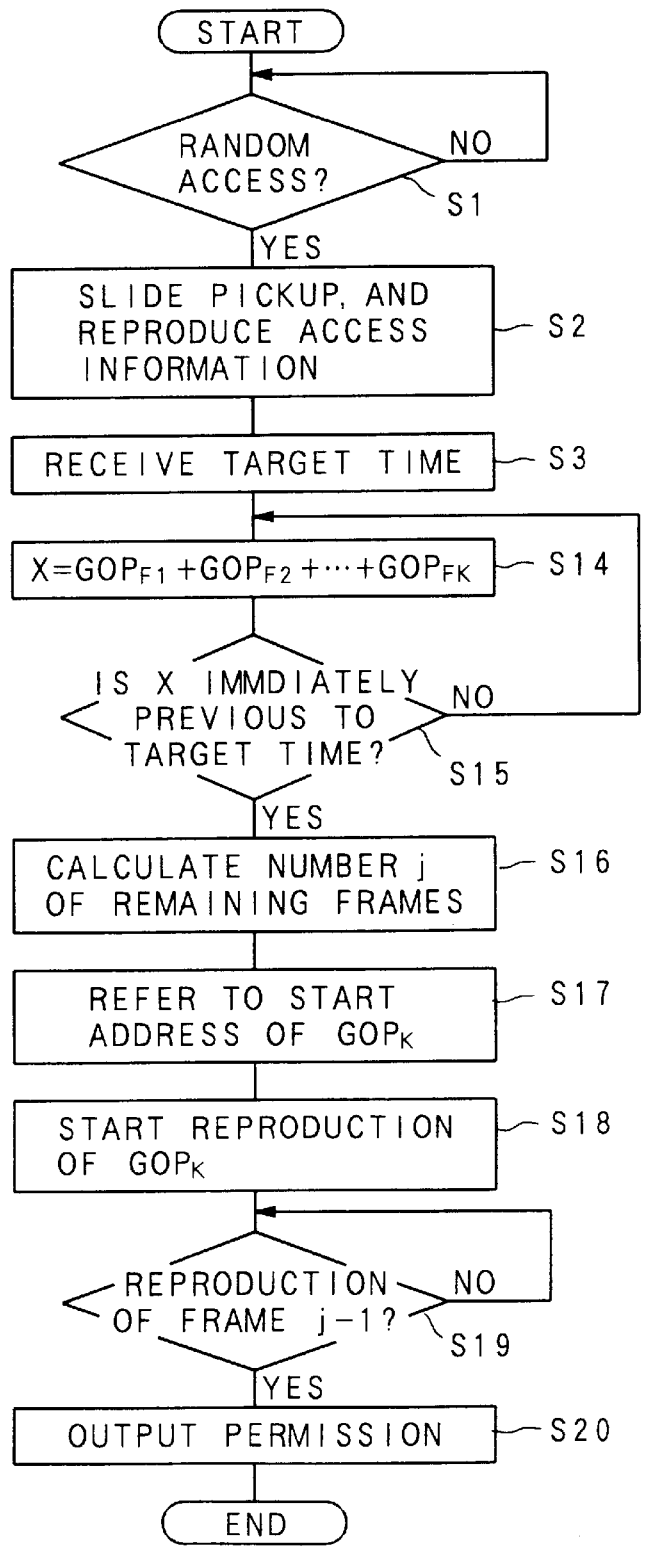
FIG. 6 is a flow chart of another example of reproducing operation in the second embodiment.
Figure 7:
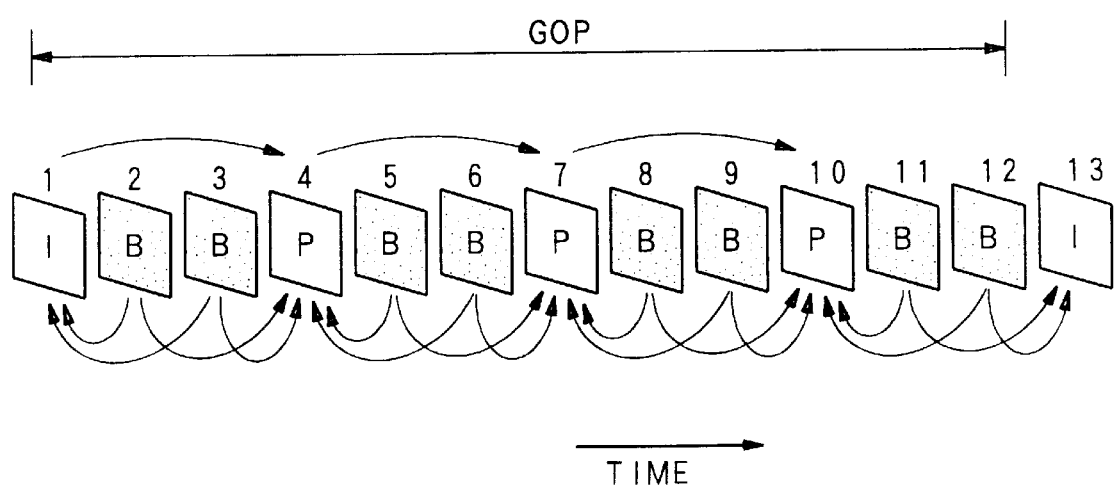
FIG. 7 is a diagram showing frame pictures constituting the GOP in a bit stream.

The optical disk DK, which has been replicated from the original disk DKo recorded in the above described manner, is reproduced by the information reproducing apparatus 200 according to a flow chart of FIG. 6. In FIG. 6, the steps same as those in FIG. 4 carry the same reference numerals and the explanations thereof are omitted.

In FIG. 6, after the processes at the steps S1 to S3, the controller 11 accumulates the number of frames constituting each GOP one after another from the first GOP, out of the access information 302 (step S14). Namely, the calculation by use of an expression "$X = GOP_{F1} + GOP_{F2} +, \ldots, + GOP_{FK}$" is performed (X: accumulation value to be calculated, FK: number of frames of $K^{th}$ GOP). The time of the accumulated total number of frames and the target time are compared to each other. Namely, it is judged whether or not the calculated value X corresponds to the GOP immediately previous to the GOP including the target time (step S15). If it is not accumulated until the GOP immediately previous to the target time (step S15: NO), the number of frames constituting the next GOP is accumulated (step S14) and the comparing process is performed again (step S15).

When the accumulation until the immediately previous GOPk is completed (step S15: YES), the time difference between the target time and the time obtained from the accumulated number of frames is calculated, so as to calculated the number j of remaining frames necessary to reach the target time (step S16). By referring to the access information 302, the start address of the immediately previous GOPk is obtained, and the reproduction of the GOPk is started (step S18).

It waits for the reproduction of the frame corresponding to the number j−1 of frames immediately previous to the target time from the lead of the GOPk obtained at the step S16 (step S19: NO). When the frame corresponding to the number j−1 of frames is reproduced (step S19: YES), the signal output of the video signal Sv and the audio signal Sa is permitted (turned ON) to the signal processing section 16.

As described above, the controller 11 recognizes the start address of each packet data and the number of frames of the GOP constituting each packet data in advance, a speedy search operation is possible.

(III) Modified Embodiments

The present invention is not limited to the above described embodiments, but can be adapted in many different ways.

For example, although the present invention is adapted to perform the searching operation in the above embodiments, the present invention can be adapted to perform other type of random accessing operation such as a scanning operation, a reverse reproducing operation and so on. In this case, since the controller 11 recognizes the position of the video information for a certain time period on the optical disk DK, the speedy access by a unit of this certain time period can be performed.

In the above embodiments, although the MPEG method is employed as the signal compressing method, various known compressing method can be employed in the present invention such as the JPEG method, the wavelet converting method and soon. Especially, in case of a compressing method in which the data amount corresponding to a constant record time is variable as in the case of FIG. 8B, the present invention is very effective.

In the above embodiments, although the access information is recorded at the most inner circumference side (i.e. the lead-in area) of the optical disk DK, it is also possible to manage a plurality of video softwares by a file unit based on the ISO9660 standard, for example, and to record the access information to each of the file unit. In this case, the access information is recorded at the lead portion of each file, for example, and the compressed video and audio information is recorded after the access information.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording medium comprising:

a plurality of data units generated by applying a predetermined signal processing to main information; and access information including a plurality of time unit address data each corresponding to the main information being divided based on a predetermined time interval.

2. The medium according to claim 1, wherein the access information further includes a start address of each of the data units.

3. The medium according to claim 1, wherein each of the data units includes compressed video data.

4. An information recording medium comprising:

a plurality of data packets generated by applying a predetermined signal processing to main information, each of the data packets including time axis information indicating presentation time when data in each of the plurality of data packets is to be reproduced; and access information including a plurality of time unit address data, each of the plurality of time unit address data corresponding to the main information being divided based on a predetermined time interval.

5. An information reproducing apparatus for reproducing information from an information recording medium comprising a plurality of data units generated by including a plurality of time unit address data each corresponding to main information being divided based on a predetermined time interval, the information reproducing apparatus comprising:

a pickup for obtaining a read signal from the information recording medium;

demodulating means for demodulating the read signal;

input means for inputting a target time; and searching means for searching information corresponding to the inputted target time based on at least one of the plurality of time unit address data.

6. The apparatus according to claim 5, wherein the searching means also searches for access information that includes a start address of each of the plurality of data units.

7. The apparatus according to claim 5, wherein each of the plurality of data units includes compressed video data.

8. An information reproducing apparatus for reproducing information from an information recording medium comprising a plurality of data packets generated by applying a predetermined signal processing to main information, each of the data packets including time axis information indicating presentation time for reproduction of each the plurality of data packets, and access information including a plurality of time unit address data, each of the plurality of time unit address data corresponding to the main information being divided based on a predetermined time interval, the information reproducing apparatus comprising:

a pickup for obtaining a read signal from the information recording medium;

demodulating means for demodulating the read signal;

input means for inputting a target time; and searching means for searching information corresponding to the inputted target time based on the time axis information and at least one of the plurality of time unit address data.

* * * * *